United States Patent Office 3,247,451
Patented Apr. 19, 1966

3,247,451
CONSTANT CURRENT REGULATOR
Aloysius J. Hauck, Milwaukee, Wis., assignor to Basic Products Corporation, Milwaukee, Wis., a corporation of Wisconsin
Filed June 21, 1962, Ser. No. 204,165
9 Claims. (Cl. 323—66)

This invention relates to electric current regulators and particularly to a constant current regulator for airport lighting systems or the like.

Airport lighting systems employ a plurality of lamps, such as of the gaseous discharge type or of the incandescent type, which are operated at varying levels of brightness. It is necessary in such a system to keep the current constant at any selected value. Variations and unwanted transients may damage the lamps in such a system. In prior arrangements, it has been difficult to measure the R.M.S. or effective current and then properly to amplify the same so as to control the current in the circuit. When the current is distorted, such as where saturable reactors are employed, it is difficult properly to control the current. The transient response must be quite fast in order to prevent damage to the lamps or other equipment in the circuit.

One of the objects of the invention is to provide a regulator system having fast transient response.

Another of the objects of the invention is to provide an arrangement wherein the current to the load is employed for operating a static controller including a magnetic amplifier.

Another object of the invention is to provide a regulator wherein the controller output may be increased even with lowering of input voltage thereto.

In one aspect of the invention, a power modulator, such as a saturable reactor, is provided between the input and output of the circuit. A current transformer is employed in the output circuit to obtain an A.C. signal proportional to the output. A Hall effect device serving as a conversion means receives the aforementioned proportional A.C. output signal and provides a D.C. signal whose value is a measure of the effective value of the output current, such as the R.M.S. value. A reference signal is connected to a summation or comparison means to which a signal from the Hall effect means is also connected. A magnetic amplifier means then receives the summation or compared signal and feeds it to a silicon controlled rectifier arrangement which in turn feeds D.C. to the control windings of the saturable reactor. The summation or comparison means is a second harmonic modulator type. It receives the converted signal from the Hall effect device and in turn controls the magnetic amplifier. The device can be used for other than A.C.

These and other objects, advantages and features of the invention will become apparent from the following description and drawings which are merely exemplary.

The invention will be described in conjunction with its use as a constant current regulator, but it is to be understood that the principles could be used to maintain constant voltage, power, temperature or other characteristics transferable into an electric signal.

Figure 1:
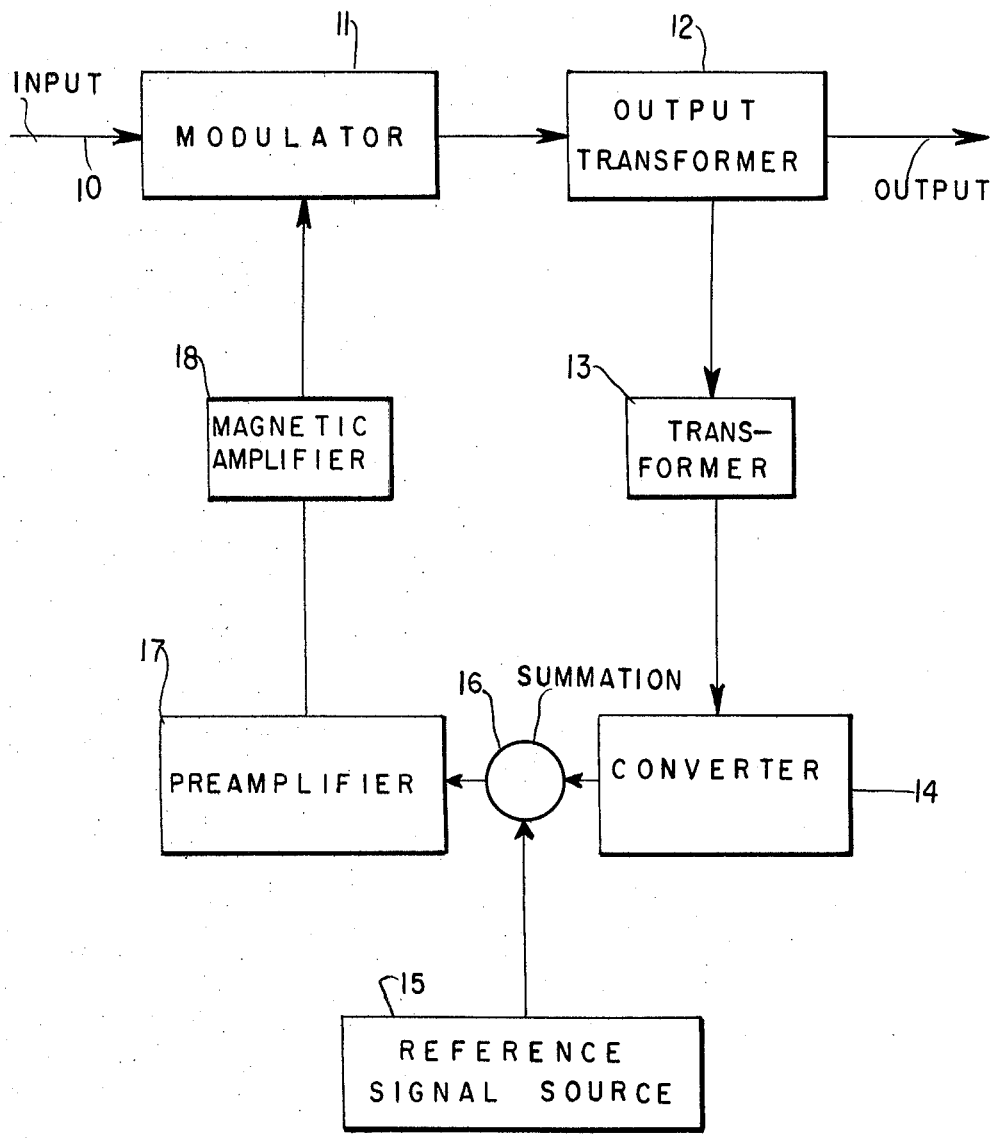
FIG. 1 is a block diagram showing the general arrangement of the invention.

Referring to FIG. 1, the source 10 of A.C. input power is fed to output transformer 12 through a power modulator or saturable reactor means 11. A signal is derived from the output circuit by transformer means 13. The signal from transformer 13 is an output or load current or voltage signal. Hall effect device 14 converts the A.C. output signal to a D.C. signal which is a measure of the effective or R.M.S. value of the output such as the output current. The reference signal source 15 and the D.C. signal from the conversion means 14 are fed to a summation or comparison network 16. The summed signal then is fed to a signal preamplifier 17 of the second harmonic modulator type, output thereof being in turn connected to an intermediate amplifier 18 in the form of a magnetic amplifier arrangement. The output of the magnetic amplifier is connected to a silicon controlled rectifier means which in turn controls the control windings of the saturable reactor 11.

Figure 2:
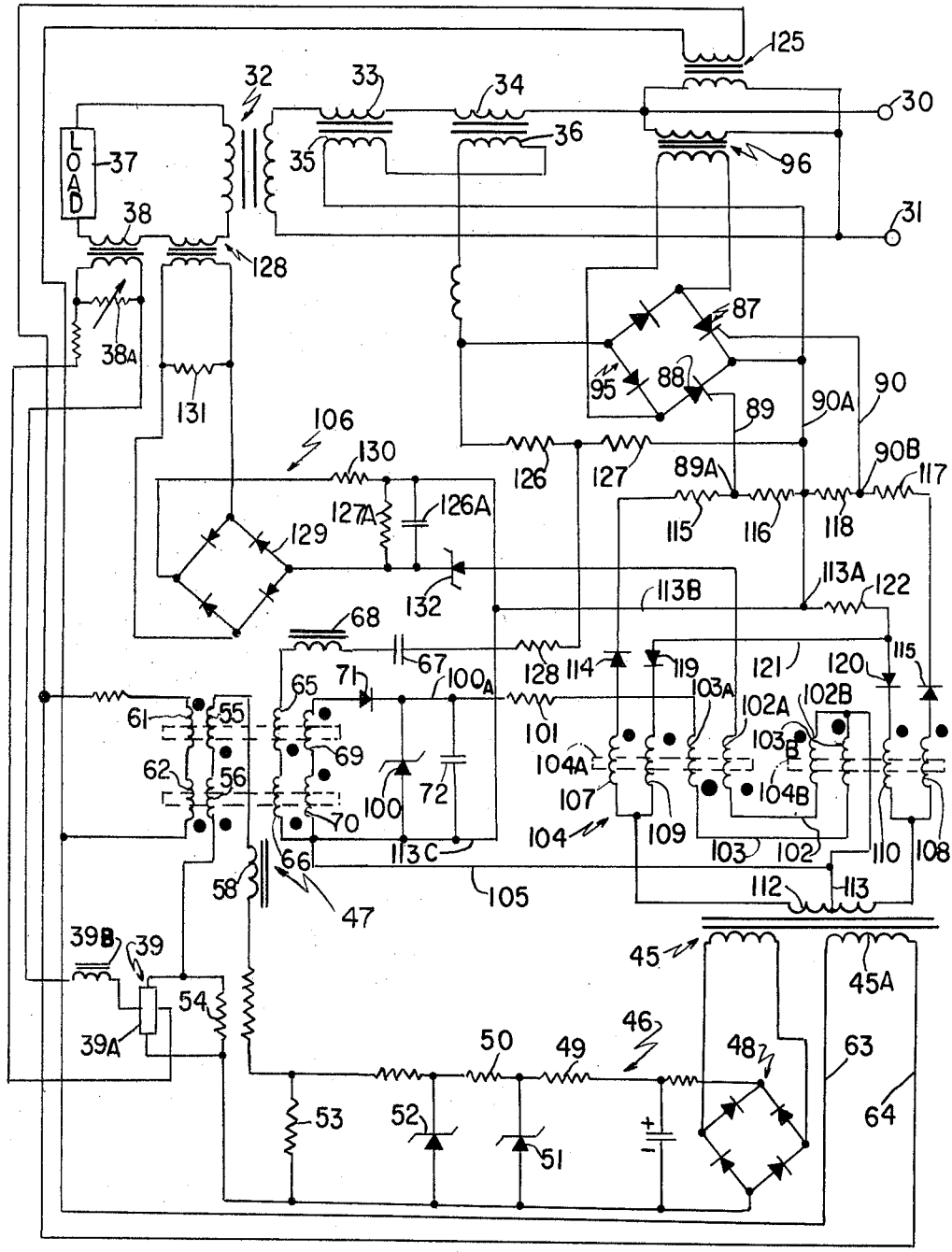
FIG. 2 is a circuit diagram of one form of the invention.

Referring now to FIG. 2, A.C. power input is indicated at 30, 31. Output transformer 32 is connected to the power input through saturable reactor load or gate windings 33, 34, the saturable reactors having control windings 35, 36, respectively. Load 37 has a transformer 38 in the load circuit for feeding the Hall effect device shown generally at 39. Variable resistance 38A may be used to vary the output such as the brightness level of lamps fed thereby. The Hall effect device 39 has a wafer 39A and a magnetic circuit with an air gap 39B (not shown) into which the wafer is inserted. Transformer 45 connected to transformer 125 supplies the voltage to operate the reference supply, generally indicated at 46. In the reference supply, rectifier bridge 48 provides a voltage which is filtered and regulated by the network including resistors 49, 50 and Zener diodes 51, 52, such providing a reference voltage to resistor 53. The reference voltage is compared with the output of the Hall effect device which appears across resistor 54, through a circuit which will produce a net difference voltage applied to the control windings 55, 56 through choke 58. The excitation windings of second harmonic modulator 47 are 61, 62 which are supplied from transformer 125.

Second harmonic modulator 47 may have anti-hunt feedback windings 65, 66, such being connected to the output of the controlled rectifier bridge 95 through a capacitor 67 and inductance 68. The second harmonic modulator 47 has output windings 69, 70, said output being rectified by diode 71 and filtered by means of capacitor 72.

Zener diode 100 is connected across the rectified output of second harmonic modulator 47 so as to limit the output of the second harmonic modulator. Lead 100A is connected through resistor 101 to the control windings 103A and 103B. The magnetic amplifier arrangement 104 shown is on two cores 104A, 104B with the control winding split between the cores. For example, control winding 102A is on core 104A and winding 102B is on core 104B, the windings being connected by lead 102. Control winding 103A is on core 104A and winding 103B is on core 104B, the windings being connected by lead 103. The return from the control winding to the output windings 69, 70 is through lead 105.

Windings 102A and 102B are provided to permit current limiting action by the current limit circuit 106.

Magnetic amplifier 104 also has gate windings 107, 108 and bias windings 109 and 110 supplied from transformer 45. These may be on separate cores 104A, 104B, respectively. The transformer 45 in addition to having two windings, which may be 120-volt windings, has a center tap winding 112 with a rating, for example, of 18 volts R.M.S. on each side of center tap 113. Diode 114 is in series with gate winding 107 and diode 115 is in series with gate winding 108.

Connected in the gate circuit of winding 107 and rectifier 114 are resistors 115 and 116 to center tap 113A which in turn is connected through leads 113B and 113C to lead 105 and center tap 113. Connected in series with gate winding 108 and rectifier 115 are resistors 117, 118 to center tap 113A in a manner similar to resistors 115, 116. Resistors 115, 116, 118, 117 serve as loads for the two gate winding circuits and also as voltage dividers to obtain the correct voltage for firing silicon controlled rectifiers 87 and 88 through conductors 89, 90 and 90A as seen in FIG. 2. Rectifier 119 is connected in series with bias winding 109, and rectifier 120 is connected in series with bias winding 110. The anode ends of rectifiers 119 and 120 are connected together by lead 121 and then through resistor 122 to center point 113A.

The anti-hunt circuit may include voltage dividing resistors 126, 127 and a series combination of resistor 128, capacitor 67, inductance 68 and winding 65, 66 of the second harmonic modulator 47.

In operation, magnetic amplifier 104 behaves as two independent half-wave amplifiers with individual bias windings resetting directly from the line voltage supplied from transformer 45.

The current limiting circuit 106 is provided through Zener diode 132, capacitor 126A and resistor 127A, supplied from the secondary winding of a second current transformer 128, rectifier bridge 129 and resistors 130 and 131. The current limiting circuit takes control of the magnetic amplifier 104 when the output current of the regulator exceeds a predetermined value.

The magnetic amplifier firing circuit 104 operates in the following manner. With no control signal applied to control windings 103A and 103B, bias windings 109 and 110 serve to bias magnetic amplifier 104 so that on the gating half-cycles for each core, firing does not occur, so that in effect, there is no output. As a control signal is applied from second harmonic modulator 47 through control windings 103A and 103B, the magnetic amplifier fires on each half-cycle at firing angles progressively less than 180°. At the instant that either core of the magnetic amplifier fires on the gating half-cycle, a current pulse passes through the gate winding and through the resistors, such as 115 and 116 associated with the gate winding, so that a potential appears between the terminals 89A and 113 or 90B and 113, actuating the silicon controlled rectifiers 88 and 87. As the control current level is varied, the firing angle shifts back and forth, changing not only the firing angle of the magnetic amplifier, but the alternate firing angle of the silicon controlled rectifiers 87 and 88.

When gate and reset windings are all fed from the same source, the output of the silicon controlled rectifiers is stable and actually may increase with line voltage drop. This compensates for the directly opposite characteristics of saturable reactors 33 and 34.

The output of the silicon controlled rectifier bridge 95 is connected to the control windings 35 and 36 of saturable reactors 33 and 34, the bridge 95 receiving power from transformer 96.

As one example of the construction of the second harmonic modulator 47, excitation windings 61 and 62 are wound individually on two cores. The input winding, the anti-hunt feedback winding and the output winding may be wound simultaneously over the two cores as one individual winding.

A silicon controlled rectifier is a device which has a cathode, anode and gate terminal, the device blocking in the forward direction until a small signal is applied to the gate. In one form it is of a PNPN structure.

It should be apparent that the device can be used for various purposes and that the intermediate amplifier can take various forms without departing from the spirit of the invention except as defined in the appended claims.

What is claimed is:

1. In an electric regulator, the combination including an input and an output, electric modulator means connected between said input and said output, said modulator means having control means, means for providing a signal proportional to the output, conversion means including an R.M.S. measuring means for providing a signal whose value is a measure of the effective value of the output, reference signal means, second harmonic modulator means connected with said signal conversion means and to said reference signal means, magnetic amplifier means connected to the output of said second harmonic modulator means, and means connecting said magnetic amplifier means to the control means of said modulator means for controlling the same.

2. In an electric regulator, the combination including an A.C. input and an A.C. output, power modulator means connected between said input and said output, said power modulator means having control means, means for providing an A.C. signal proportional to the output, conversion means including an R.M.S. measuring means for providing a signal whose value is a measure of the effective value of the output current, reference signal means, second harmonic modulator means connected with said signal conversion means and to said reference signal means, magnetic amplifier means connected to the output of said second harmonic modulator means, and means connecting said magnetic amplifier means to the control means of said power modulator means for controlling the same.

3. In an electric regulator, the combination including an A.C. input and an A.C. output, saturable reactor means connected between said input and said output, said saturable reactor means having control winding means, means for providing an A.C. signal proportional to the output, conversion means including an R.M.S. measuring means for providing a signal whose value is a measure of the effective value of the output current, reference signal means, second harmonic modulator means connected to said reference signal means and to said signal conversion means to provide a summation signal, means connecting said second harmonic modulator means to a magnetic amplifier, silicon controlled rectifier means connected to said control winding means, and means connecting the gating means of said silicon controlled rectifier means to said magnetic amplifier means.

4. In an electric regulator, the combination including an A.C input and an A.C. output, saturable reactor means connected between said input and said output, said saturable reactor means having control winding means, means for providing an A.C. signal proportional to the output, conversion means including an R.M.S. measuring means for providing a signal whose value is a measure of the effective value of the output current, adjustable reference signal means, second harmonic modulator means connected to said reference signal means and to said signal conversion means to provide a summation signal, means connecting said second harmonic modulator means to a magnetic amplifier, silicon controlled rectifier means connected to said control winding means, and means connecting the gating means of said silicon controlled rectifier means to said magnetic amplifier means.

5. In an electric regulator, the combination including an A.C. input and an A.C. output, saturable reactor means connected between said input and said output, said saturable reactor means having control winding means, means for providing an A.C. signal proportional to the output, conversion means including an R.M.S. measuring means for providing a signal whose value is a measure of the effective value of the output current, adjustable reference signal means, second harmonic modulator means connected to said reference signal means and to said signal conversion means to provide a summation signal, means connecting said second harmonic modulator means to a magnetic amplifier, silicon controlled rectifier means connected to said control winding means, means connecting the gating means of said silicon controlled rectifier means to said magnetic amplifier means, and current limiting means connected to said output and to said magnetic amplifier for limiting current in said output to a predetermined value.

6. In an electric regulator, the combination including an A.C. input and an A.C. output, power modulator means connected between said input and said output, said power modulator means having control means, means for providing an A.C. signal proportional to the output, conversion means including an R.M.S. measuring means for providing a signal whose value is a measure of the effective value of the output current, reference signal means, second harmonic modulator means connected with said signal conversion means and to said reference signal means, magnetic amplifier means connected to the output of said second harmonic modulator means, said magnetic amplifier means having a pair of cores and a pair of control windings, a portion of each control winding being on each core, and means connecting said magnetic amplifier means to said power modulator control means for controlling the same.

7. In an electric regulator, the combination including an A.C. input, an A.C. output, saturable reactor means connected between said input and said output, said saturable reactor means having control winding means, means in said output including transformer means for providing an A.C. signal proportional to said output, Hall effect conversion means including an R.M.S. measuring means for providing a signal whose value is a measure of the effective value of the output current, transformer means in the output circuit for feeding said Hall effect conversion means, reference signal means, a transformer for feeding said reference signal means, means connecting said reference signal means to said Hall effect conversion means, second harmonic modulator means having winding means connected to said reference signal means and to said Hall effect conversion means, magnetic amplifier means having a pair of cores and a pair of control windings connected to the output of said second harmonic modulator means, a portion of each of said control windings being located on each core, silicon controlled rectifier bridge means connected to the output windings of said magnetic amplifier, and means connecting said silicon controlled rectifier means with the control winding means of said saturable reactor means.

8. In an electric regulator, the combination including an A.C. input and an A.C. output, electric modulator means connected between said input and said output, said modulator means having control means, means for providing an A.C. signal proportional to said output, Hall effect conversion means including an R.M.S. measuring means for providing a signal whose value is a measure of the effective value of the output current, reference signal means connected to a transformer fed by said A.C. input, second harmonic modulator means connected with said signal conversion means, to said reference signal means and to said control means, magnetic amplifier means having a pair of control windings and a pair of cores, a portion of each control winding being on each of said cores, said magnetic amplifier means having a pair of gate windings, one on each of said cores, means connecting said transformer with said gate windings, silicon controlled rectifier bridge means connected to said gate windings, and means connecting said gate windings with said control means.

9. In an airport lighting system wherein the lamps are to be maintained at a uniform brilliance and are to be protected against power surges which may damage the lamps, electric regulator and protection apparatus including an input adapted to be connected to an A.C. source and an output adapted to be connected for energizing the lamps, electric modulator means connected between said input and output, said modulator means having a control terminal, a Hall effect device responsive to the current in the output, reference signal means for providing a reference, comparison circuit means connected to said Hall effect device and to said reference signal means, magnetic amplifier means connected between the output of said comparison circuit means and said control terminal for controlling said electric regulator means, and current limiting means responsive to the current in the output and connected to said magnetic amplifier for preventing power surges in the output.

References Cited by the Examiner

UNITED STATES PATENTS

| | | | |
|---|---|---|---|
| 2,709,779 | 5/1955 | Bixby | 323—89 |
| 2,754,473 | 7/1956 | Hooper | 323—56 |
| 2,866,151 | 12/1958 | Applin | 323—66 |
| 2,961,594 | 11/1960 | Mah | 323—66 |
| 2,987,666 | 6/1961 | Manteuffel | 321—25 |
| 2,990,509 | 6/1961 | Hauck | 323—89 |
| 3,012,187 | 12/1961 | Johnson | 323—66 |
| 3,045,174 | 7/1962 | LaFuze | 323—89 |
| 3,089,995 | 5/1963 | Kleinman | 321—46 |

LLOYD McCOLLUM, *Primary Examiner.*